Nov. 21, 1961     H. P. MADSEN     3,009,851
PROCESS AND APPARATUS FOR SEVERING FILM
Filed Aug. 16, 1957     5 Sheets—Sheet 1
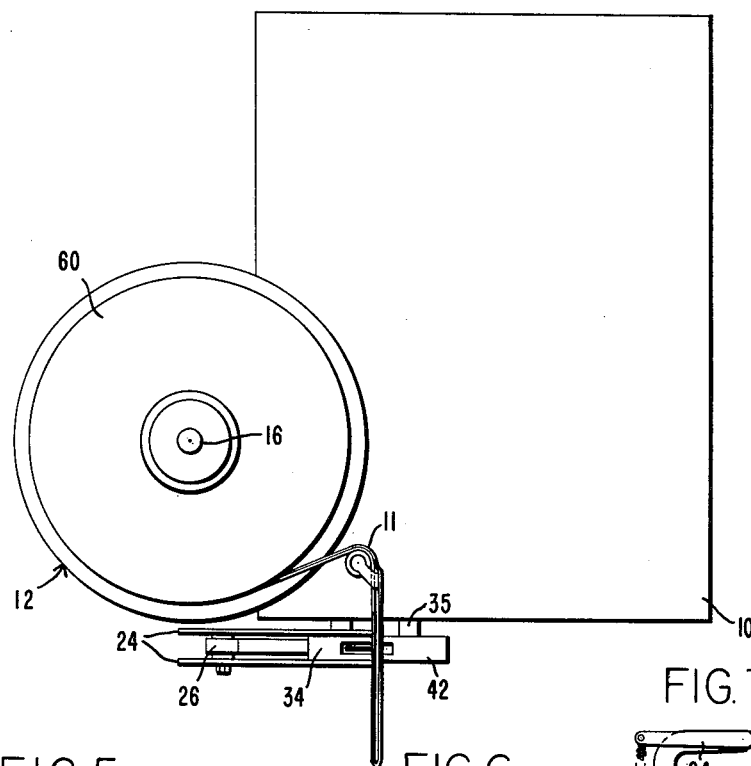
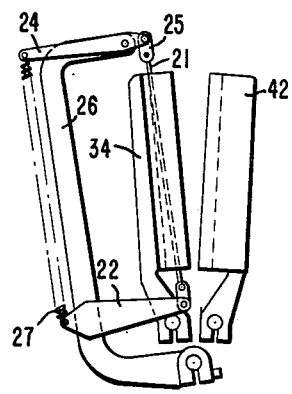
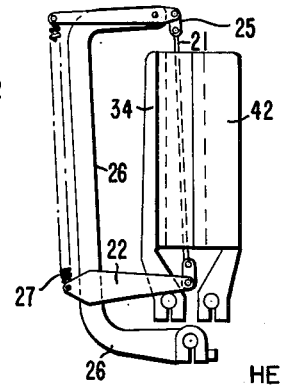
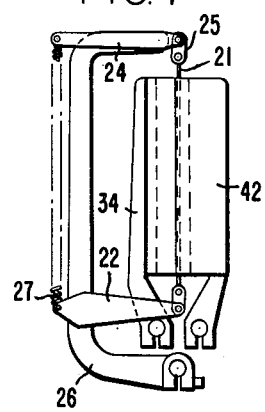
INVENTOR
HERMAN PETER MADSEN
BY *Herbert M Wolfson*
ATTORNEY

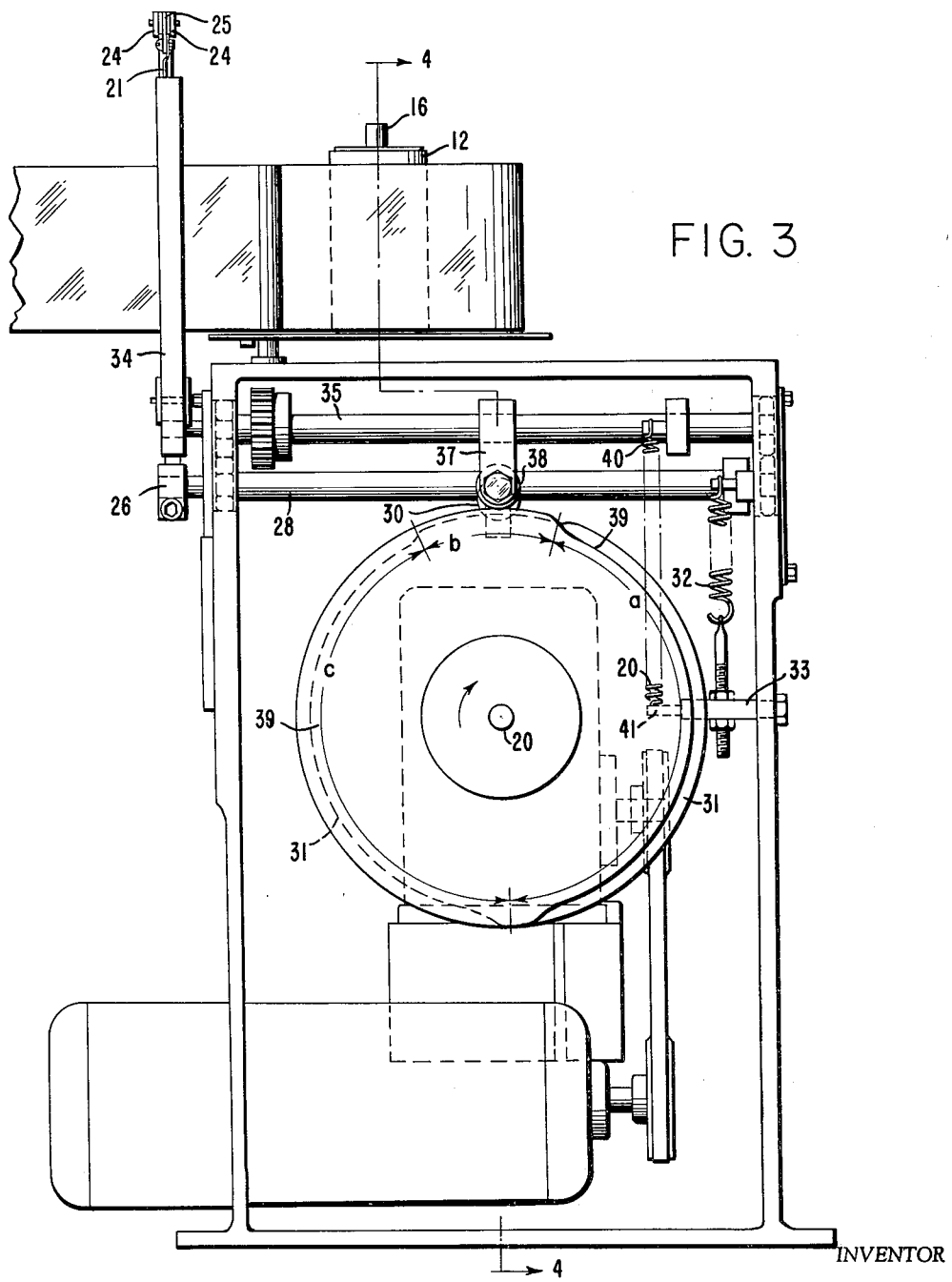

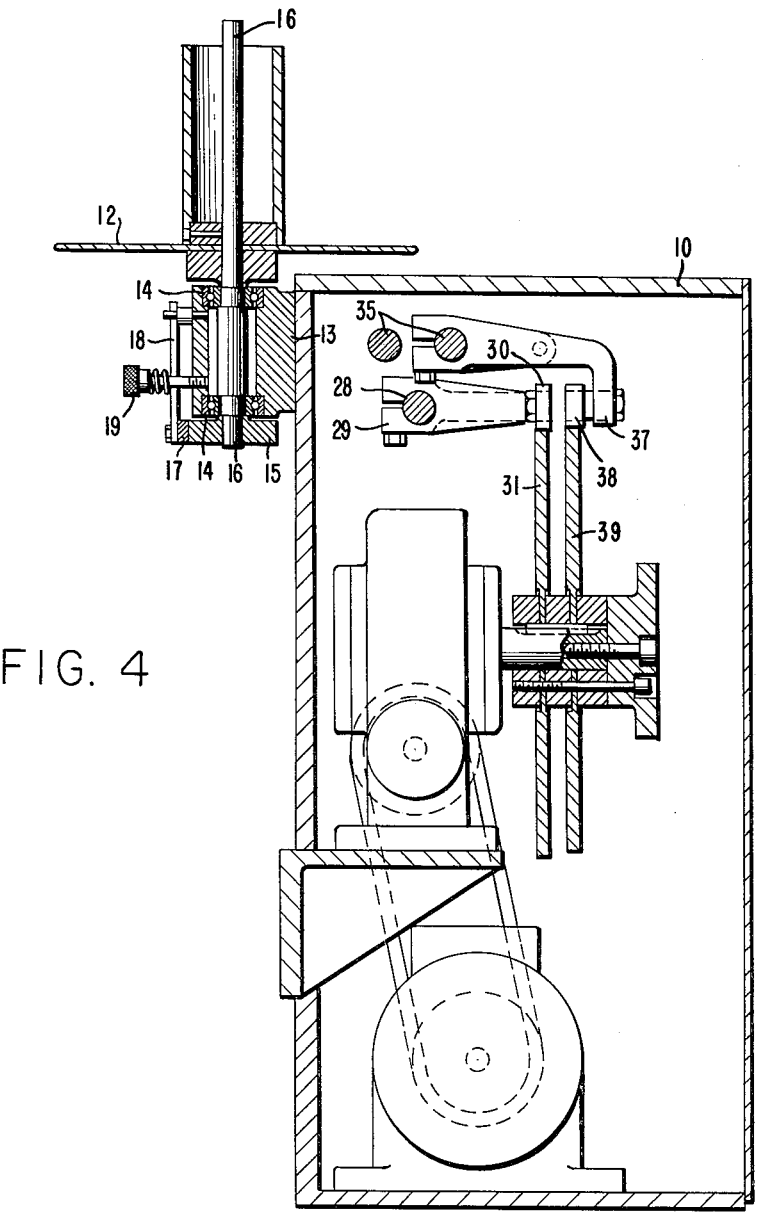

Nov. 21, 1961     H. P. MADSEN     3,009,851
PROCESS AND APPARATUS FOR SEVERING FILM

Filed Aug. 16, 1957     5 Sheets-Sheet 5

INVENTOR
HERMAN PETER MADSEN

BY
ATTORNEY

United States Patent Office 3,009,851
Patented Nov. 21, 1961

3,009,851
PROCESS AND APPARATUS FOR
SEVERING FILM
Herman Peter Madsen, Newark, Del., assignor to E. I. du Pont de Nemours and Company, Wilmington, Del., a corporation of Delaware
Filed Aug. 16, 1957, Ser. No. 678,569
10 Claims. (Cl. 156—159)

This invention relates to the packaging field and, more particularly, to sealing oriented, crystalline polymeric film such as oriented, crystalline polyethylene terephthalate film in the formation of bags, pouches, tubes, and envelopes from sheets thereof.

In making bags, pouches, etc., it has been suggested to superimpose or fold sheets of a film and then to use a thin heated element such as a heated wire or knife to serve the dual purpose of cutting the sheets and sealing the severed edges simultaneously. However, in applying this suggested procedure to oriented crystalline polymeric film, puckered or wrinkled seals have resulted and often the material surrounding the seal has become embrittled.

The object of the present invention is a process and apparatus for simultaneously cutting and sealing oriented, crystalline polymeric film without encountering the aforementioned difficulties. A further object is to form hairline seals having excellent appearance and a tensile strength not less than 50% of the tensile strength of the film. Other objects will appear hereinafter.

The invention will be described as it applies to oriented, crystalline polyethylene terephthalate film. However, the invention is not so limited but applies to all polymeric films which exhibit a tendency to shrink or become embrittled when exposed to moderately elevated temperatures.

The objects are accomplished by a process which comprises the steps of superimposing a plurality of layers of thermoplastic polymeric film such as oriented crystalline polyethylene terephthalate film; holding the layers securely on both sides of the intended line of severing and sealing; softening by heating the intended line of severing and sealing while withdrawing heat from the areas adjacent to the intended line of severing and sealing; and thereafter severing the superimposed layers along the softened line while simultaneously heating the layers above the crystalline melting temperature of the film, above 230° C. in the case of oriented, crystalline polyethylene terephthalate film, to seal the severed ends.

The apparatus for carrying out the foregoing process comprises means for gripping and engaging a portion of superimposed layers of film on both sides of an intended line of severing and sealing; means for heating these layers of film at the line of severing and sealing; means for conducting heat away from the areas adjacent to the line; and heated means reciprocally mounted for simultaneously severing and sealing the superimposed layers of film.

The invention will be more clearly understood by referring to the description and the drawings which follow.

FIGURE 1 is a plan view of an apparatus suitable for use in the present invention;

FIGURE 3 is a side elevation of the apparatus of FIGURE 1 with portions of the housing removed;

FIGURE 4 is a sectional view taken along line 4—4 of FIGURE 3;

Figure 2:
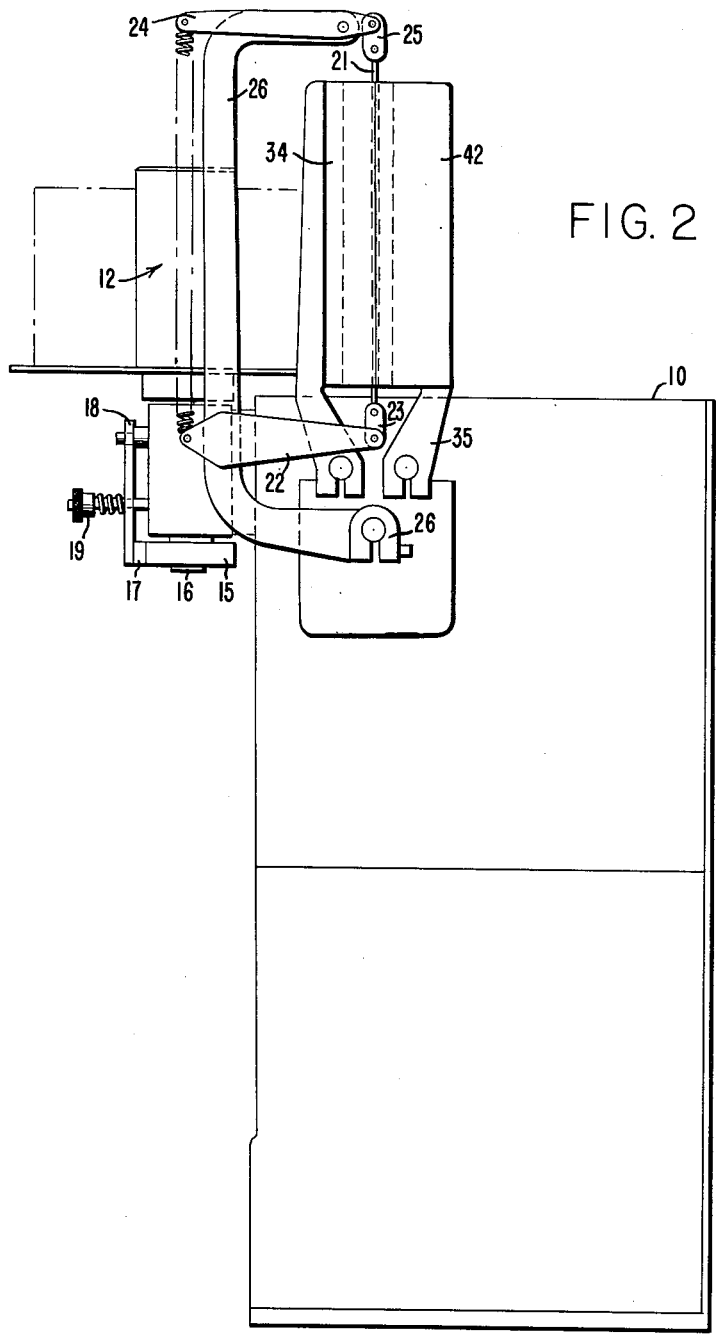
FIGURE 2 is an end elevation of the apparatus of FIGURE 1.
Figure 8:
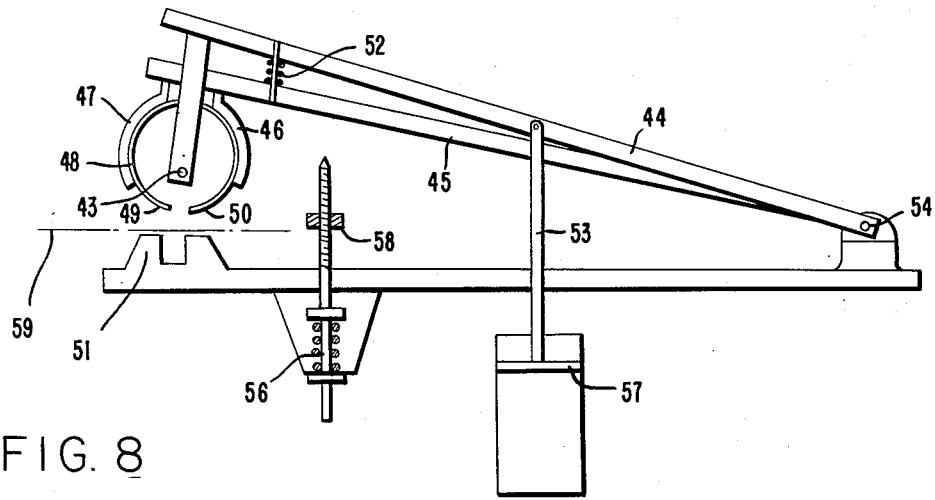
Figure 9:
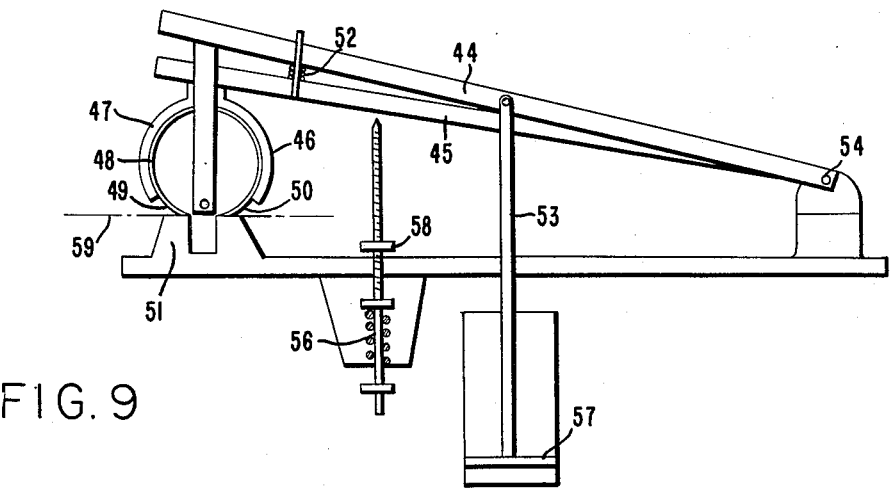

FIGURES 5, 6 and 7 are fragmentary end views of the cutting and sealing means of the apparatus and the means for clamping the film, showing how these elements cooperate through several stages to produce the desired results; and FIGURES 8 and 9 are side elevations of another embodiment of the apparatus suitable for use in the present invention showing the cooperation of the important elements including a flexible clamping surface in two stages to produce the desired results.

Referring to FIGURES 1–4, the apparatus is largely enclosed in a box-like housing 10, certain elements, however, necessarily being outside the housing; but secured thereto and supported thereby. Film to be cut up into sections and sealed may be carried in coil form on a vertical spindle 12 extending above the top of the housing and secured rotatably thereto by means of an apertured bracket 13 welded to one side of the housing 10 and carrying a pair of ball bearing races 14. Brake means including a brake drum 15 keyed to the lower end of spindle shaft 16, a brake shoe 17, a holder 18 for the shoe and an adjusting stud 19 engaging the holder and bracket 13, are provided to enable control over spindle shaft rotation and tension in the film during processing. As shown in FIGURE 1, a stationary, upstanding guide roller 11 is secured rotatably to the top of housing 10 adjacent to spindle 12 to guide the film being stripped from roll 60.

The preferred cutting and sealing device is a flat hot wire 21 suitably electrically heated by means not shown but obvious to those skilled in the art. However, it will be understood that any element, wire, knife blade, etc. heated by any means may be used provided it will cut the material and simultaneously seal the cut edges thereof. Wire 21 is suspended vertically between a bracket 22 disposed below the lower end of the wire and coupled thereto by means of a spacer 23, and a pair of closely-spaced take-up levers 24 disposed above the upper end of the wire and connected thereto by means of a similar spacer 25. Lever 24 and the bracket 22 are carried by means of a frame 26 of generally U-shape and the ends of these parts remote from the wire are connected by means of a tension spring 27 to assure proper tension in the wire at all times. The lower end of frame 26 is socketed for keyed engagement with a horizontally extending shaft 28, one end portion of which extends through the forward end of housing 10 while the remainder thereof is exposed within the housing and is rotatably supported thereby. Between its ends and within the housing, shaft 28 is provided with a cam lever 29 carrying a cam roller 30. A disc cam 31 keyed to cam shaft 20 engages roller 30 and causes reciprocating rotary motion of shaft 28 on its axis at predetermined intervals, and also causes a rocking motion of wire 21 through a vertical arc around the shaft 28 as a pivot. A spring 32 secured to shaft 28 and anchored to housing 10 as indicated at 33, resiliently opposes the turning of the shaft to carry the wire away from the film and assures a positive force at all times available to return the wire to its cutting engagement with the film.

To hold the film in position during the cutting operation and to protect the wire at all times, a pair of opposed pressure bars or clamping jaws 34 and 42 are provided, these jaws having opposed recesses in which wire 21 may be disposed. The jaws extend substantially the full vertical height of the wire, only the extreme end portions of the wire in the vicinity of spacers 23 and 25 being exposed. At their lower ends, the jaws 34 and 42 are keyed to two horizontally disposed shafts 35 carried rotatably by housing 10 above shaft 28. Shafts 35 are operatively associated by means of a pair of gears 36 keyed thereto and one of these shafts carries a cam lever 37 provided with a cam roller 38. A third disc cam 39 is provided for engagement with roller 38 and is keyed to cam shaft 20 whereby reciprocating rotary motion of shafts 35 can be obtained to move the clamping jaws toward and away from each other in the manner indicated in FIGURES 5–7, inclusive. To assure the return of the jaws to the open position after each closing of them under the positive action of cam 39, a spring 40 is provided, being connected to one of the shafts 35 in the manner of spring 32 and being anchored to housing 10 as indicated at 41.

As this apparatus is operated, wire 21 and the clamping jaws 34 and 42 are in the starting position shown in FIGURE 5. Their respective cam rollers, 30 for the wire and 38 for the jaws, are in contact with disc cams 31 and 39, respectively, along the arc designated "a." The superimposed layers of film, either a folded single sheet or two superimposed sheets, are then moved between the jaws and the jaws are brought against them as indicated in FIGURE 6. Simultaneously, the heated wire 21 is moved through the recess in jaw 34 and is momentarily stopped in its path to pre-heat the superimposed layers along the intended line of seal. The arc on disc cams 31 and 39 designated "b" corresponds to FIGURE 6. The cam roller 31 then proceeds to the arc designated "c" and through the means described previously; the wire 21 passes through the superimposed layers into the recess of clamping jaw 42 as shown in FIGURE 7. Subsequently, the jaws are released and the wire returns to its original position of FIGURE 5.

In its preferred form, the cutting and sealing element is a wire or thin knife blade which may be heated to a cherry red condition by the flow of electric current. It should be heated to a temperature appreciably above the crystalline melting temperature of the film (200–230° C. for oriented, crystaline polyethylene terephthalate film) which is to be sealed, preferably about twice the crystalline melting temperature of the film. When sealing oriented, crystalline polyethylene terephthalate film, the temperature of the hot sealing element is preferably about 540° C. The use of a thin nichrome wire, about 0.045" in diameter, in accordance with this procedure provides a thin line seal of excellent appearance and high strength. For certain purposes it may be desirable to use, as an alternative to the heated wire or knife blade, a heated sealing apparatus that would perforate (instead of sever) the surfaces of the superimposed layers of film.

In the operation of the apparatus, the clamping jaws serve a dual purpose. Shrinkage of the molten film is restricted by the clamping action of the jaws. Of even greater importance, however, the jaws serve as a conductor of heat to remove heat rapidly from the sealed area and from the film area immediately adjacent to the line of seal. Thus, the clamping surfaces prevent film areas adjacent to the line of seal from reaching excessively high temperatures, and consequently, prevent excessive film shrinkage adjacent to the sealed area. It is, therefore, necessary that the clamping surfaces or pressure bars be efficient conductors of heat, preferably formed of metal.

The step of pre-heating the superimposed layers, as described, is the essential feature of the present invention. The pre-heating step is the margin of difference between acceptable heat seals and seals which are weak. The reason for the success achieved by this step is not entirely understood. It may be that the hot sealing element would lose an appreciable portion of its heat if it immediately contacted the superimposed layers which had not been pre-heated. However, by pre-heating the intended line of seal, a simultaneous and uniform rise in the temperature of the superimposed layers is achieved upon actual contact with the sealing element, thereby resulting in the formation of a seal of uniform strength.

In FIGURES 8 and 9, the operation of a unique flexible clamping surface is illustrated in another embodiment of the present invention. This apparatus is primarily designed for heat sealing superimposed layers of oriented, crystalline films which are relatively heat shrinkable at elevated temperatures, e.g., oriented, crystalline polyethylene terephthalate film which has not been heat set.

In operation, the wire sealing element 43 held by its supporting arm 44 is shown in its starting position in FIGURE 8. The arm 44 is pivoted at point 54. Arm 45 serves to hold a relatively flexible metal tube 48 in place through extensions 46 and 47 depending from arm 45. The tube 48 is preferably aluminum, having an outside diameter of 1½" and a wall thickness of about 1/16". It has a peripheral segment removed through which the wire 43 can pass. The adjacent peripheral surfaces (adjacent to the removed peripheral segment) are the flexible faces of the clamping surfaces on each side of the intended line of seal. The opposing base surfaces 51 of the clamping means are rigid metal surfaces over which the superimposed layers of film 59 are moved intermittently.

The arm 44 to which the wire 43 is connected and arm 45 to which the tube 48 is connected, are actuated into a reciprocating movement by means of a piston 57 which is driven down by compressed air by means not shown, which movement pulls down tie rods 53. The tie rods pull down on the wire-supporting arm 44 directly and also pull down the clamp-supporting arm 45 through the spring linkage 52. Both arms 44 and 45 proceed downward at the same relative position until the clamping means 48 makes contact with the film layers 59 and the base clamping surface 51. At this point the component parts of the apparatus are in the relative positions shown in FIGURE 9.

At the point illustrated in FIGURE 9 the clamp-supporting arm 45 stops moving except for the amount of residual movement provided by the flexibility of the peripheral surfaces 49 and 50 of tube 48 which contact the rigid base surfaces 51. The piston 57, however, continues to move and hence, wire-supporting arm 44 continues to move down. The downward movement of wire-supporting arm 44 starts to compress the springs in linkage 52, thus controlling the amount of pressure on the flexible surfaces 49 and 50. The wire-supporting arm 45, and hence the wire itself, is at this point proceeding downwardly until the arm 45 makes contact with the stop 55. From this point on, springs 56 must be compressed. The time required for the air pressure in the cylinder to take up the compression in the springs 56 is the pre-heating time wherein the wire is in close proximity to, but out of contact with the superimposed layers of film. The stop 55 is set so that the pre-heating takes place when the hot wire is about 1/16" above the film surface. Subsequently, when the compressive forces of the spring have been overcome by the air pressure upon the piston 57, the hot wire continues downwardly and passes through the superimposed layers of film to sever and seal them. This downward motion is stopped at a selected distance of "cut-through," by the adjustable nut 58. After the downward motion has been completed, the cycle is reversed and the wire-supporting arm 44 returns to the position relative to arm 45 as shown in FIGURES 8 and 9.

The employment of a flexible clamping face in combination with relatively rigid opposed faces, as shown in FIGURES 8 and 9, provides for uniform clamping along lines parallel to the line of seal, thereby completely restricting shrinkage of the sealed edges of the film. This is extremely important, particularly when severing and sealing highly shrinkable film. No matter how smooth and uniform the clamping surfaces may be machined, minute irregularities in the clamping surfaces are usually present. These irregularities tend to cause the formation of weaknesses (such as pinholes) in the ultimate seal because of the tendency of the film to shrink beyond the irregularities in the clamping surfaces. The flexible clamping surface, as described, deflects under the pressures applied thereto, thus compensating for any irregularities in the surfaces of the opposing faces of the clamping means. This results in uniform clamping of the superimposed layers of film. The use of the relatively flexible metal tubing as a clamping surface, therefore, is a very practical and unique arrangement to obtain the flexibility needed in at least one face of opposed clamping surfaces. It is conceivable that other arrangements to compensate for irregularities in the contacting faces of the clamping surfaces could be fabricated. The use of a resilient material as one face of opposite faces of clamping surfaces, such as a high temperature rubber, may be employed. However, it would be necessary to provide, on the other hand, a high temperature rubber having metal particles dispersed in the rubber to achieve the second purpose of the clamps; namely, conducting heat rapidly away from the areas of the film adjacent to the seal.

Changes and modifications may be made without departing from the nature and spirit of the invention. It is understood that the invention is not limited except as described in the appended claims.

What is claimed is:

1. A process for simultaneously severing and sealing thermoplastic polymeric film which comprises the steps, in sequence, of superimposing a plurality of layers of thermoplastic polymeric film; holding the layers securely on both sides of the intended line of severing and sealing; thereafter softening by heating without contacting the intended line of severing and sealing while withdrawing heat from the areas adjacent to the intended line of severing and sealing; and thereafter severing the superimposed layers along the softened line while simultaneously heating the layers above the crystalline melting temperature of the film to seal the severed ends.

2. A process for simultaneously severing and sealing oriented, crystalline polyethylene terephthalate film which comprises the steps, in sequence, of superimposing a plurality of layers of oriented, crystalline polyethylene terephthalate film; holding the layers securely on both sides of the intended line of severing and sealing; thereafter softening by heating without contacting the intended line of severing and sealing to a temperature of 200–230° C. while withdrawing heat from the areas adjacent to the intended line of severing and sealing; and thereafter severing the superimposed layers along the softened line while simultaneously heating the layers above 230° C. to seal the severed ends.

3. Film severing and sealing apparatus comprising a base; means thereon for gripping and engaging a portion of superimposed layers of film on both sides of an intended line of severing and sealing, said gripping means also serving as means to conduct heat away from the areas adjacent to said line of severing and sealing; heated means for heating the superimposed layers at the line of severing and sealing and for severing said superimposed layers reciprocally mounted on said base, said heated means being adapted to pre-heat without contacting said superimposed layers to a softened condition prior to severing said layers.

4. An apparatus as in claim 3 wherein said heated means for severing and sealing the film comprises a heated wire.

5. A process for simultaneously severing and sealing thermoplastic polymeric film which comprises the steps, in sequence, of superimposing two layers of thermoplastic polymeric film; holding the layers securely on both sides of the intended line of severing and sealing; bringing a wire heated to a temperature above the softening point of said film adjacent to but out of contact with the intended line of severing and sealing while simultaneously withdrawing heat from the areas on either side of the intended line of severing and sealing for a time sufficient to begin to soften the film at the intended line of severing and sealing; and, thereafter, passing said heated wire through the layers of film to simultaneously sever the layers and seal the severed ends.

6. A process for simultaneously severing and sealing oriented, crystalline polyethylene terephthalate film which comprises the steps, in sequence, of superimposing two layers of oriented, crystalline polyethylene terephthalate film; holding the layers securely on both sides of the intended line of severing and sealing; bringing a wire heated to a temperature above 230° C. adjacent to but out of contact with the intended line of severing and sealing while simultaneously withdrawing heat from the areas on either side of the intended line of severing and sealing for a time sufficient to begin to soften the film at the intended line of severing and sealing; and, thereafter, passing the heated wire through the superimposed layers of film to simulteneously sever the layers and seal the severed ends.

7. A process for simultaneously severing and sealing thermoplastic polymeric film which comprises the steps, in sequence, of superimposing two layers of thermoplastic polymeric film; holding the layers securely on both sides of the intended line of severing and sealing; bringing a knife blade heated to a temperature above the softening point of said film adjacent to but out of contact with the intended line of severing and sealing while simultaneously withdrawing heat from the areas on either side of the intended line of severing and sealing for a time sufficient to begin to soften the film at the intended line of severing and sealing; and, thereafter, passing said heated knife blade through the layers of film to simultaneously sever the layers and seal the severed ends.

8. A process for simultaneously severing and sealing oriented, crystalline polyethylene terephthalate film which comprises the steps, in sequence, of superimposing two layers of oriented, crystalline polyethylene terephthalate film; holding the layers securely on both sides of the intended line of severing and sealing; bringing a knife blade heated to a temperature above 230° C. adjacent to but out of contact with the intended line of severing and sealing while simultaneously withdrawing heat from the areas on either side of the intended line of severing and sealing for a time sufficient to begin to soften the film at the intended line of severing and sealing; and, thereafter, passing the heated knife blade through the superimposed layers of film to simultaneously sever the layers and seal the severed ends.

9. A process as in claim 6 wherein the wire is heated to a temperature of about 540° C.

10. A process as in claim 8 wherein the knife blade is heated to a temperature of about 540° C.

References Cited in the file of this patent

UNITED STATES PATENTS

| | | |
|---|---|---|
| 2,185,647 | Penn | Jan. 2, 1940 |
| 2,524,584 | Zehr | Oct. 3, 1950 |
| 2,627,213 | Nye | Feb. 3, 1953 |
| 2,706,165 | Korsgaard | Apr. 12, 1955 |
| 2,726,706 | Hakomaki | Dec. 13, 1955 |
| 2,737,859 | Allison | Mar. 13, 1956 |
| 2,762,421 | Quinche | Sept. 11, 1956 |
| 2,794,485 | Ashton | June 4, 1957 |